US011964367B2

(12) United States Patent
Hairul et al.

(10) Patent No.: US 11,964,367 B2
(45) Date of Patent: Apr. 23, 2024

(54) HAND-HELD POWER TOOL

(71) Applicant: Robert Bosch GmbH, Stuttgart (DE)

(72) Inventors: Bin Abd Manaf Hairul, Lunas (MY); Mengsi Ye, Hangzhou (CN); Max Ong Chee Hao, Shanghai (CN)

(73) Assignee: Robert Bosch GmbH, Stuttgart (DE)

( * ) Notice: Subject to any disclaimer, the term of this patent is extended or adjusted under 35 U.S.C. 154(b) by 905 days.

(21) Appl. No.: 17/008,925

(22) Filed: Sep. 1, 2020

(65) Prior Publication Data

US 2021/0069875 A1 Mar. 11, 2021

(30) Foreign Application Priority Data

Sep. 10, 2019 (DE) ..................... 10 2019 213 742.3

(51) Int. Cl.
*B25B 21/00* (2006.01)
*B25F 5/00* (2006.01)

(52) U.S. Cl.
CPC .............. *B25B 21/00* (2013.01); *B25F 5/001* (2013.01)

(58) Field of Classification Search
CPC ............. B25B 21/00; B25F 5/00; B25F 5/001
USPC ........................ 173/170, 11, 217; 81/54, 473
See application file for complete search history.

(56) References Cited

U.S. PATENT DOCUMENTS 6,923,268 B2 * 8/2005 Totsu ...................... B25B 23/14 173/4
9,352,456 B2 * 5/2016 Murthy ................... B25B 23/14
2006/0185865 A1 * 8/2006 Jung .................... B25D 16/006 173/48
2006/0267556 A1 * 11/2006 Uehlein-Proctor ....... B25F 5/00 320/132
2008/0266841 A1 * 10/2008 Gabriel ................... B25B 21/00 362/120
2009/0308628 A1 * 12/2009 Totsu ...................... B25B 23/14 173/217
2012/0160529 A1 * 6/2012 Eshleman ............... E21B 15/04 173/1
2014/0056660 A1 * 2/2014 Eshleman ............. B23B 49/005 408/9
2021/0069875 A1 * 3/2021 Hairul ....................... B25F 5/02

FOREIGN PATENT DOCUMENTS

EP 1 369 206 B1 4/2011
EP 1 775 074 B1 1/2012
JP H04-171182 A 6/1992

* cited by examiner

*Primary Examiner* — Valentin Neacsu
(74) *Attorney, Agent, or Firm* — Maginot, Moore & Beck LLP

(57) ABSTRACT

A hand-held power tool, in particular a screwdriver, includes an elongate housing, in which is arranged a drive motor for driving an insertion tool, which can be arranged in an associated tool holder. The housing has a grip region, in which at least one operating element for activating the drive motor is arranged. A sliding switch for activating reversing operation of the drive motor is arranged on the housing, a first activating unit is provided for activating the drive motor as a result of axial contact of the tool holder against a workpiece which is to be machined, and a second activating unit is provided for activating the drive motor as a result of activation of the operating element. A selector is designed to deactivate the first or second activating unit and/or to prioritize the first or second activating unit.

11 Claims, 16 Drawing Sheets

HAND-HELD POWER TOOL

This application claims priority under 35 U.S.C. § 119 to application no. DE 10 2019 213 742.3, filed on Sep. 10, 2019 in Germany, the disclosure of which is incorporated herein by reference in its entirety.

BACKGROUND

The present disclosure relates to a hand-held power tool, in particular a screwdriver, having an elongate housing, in which is arranged a drive motor for driving an insertion tool, which can be arranged in an associated tool holder, wherein the housing has a grip region, in which is arranged at least one operating element for activating the drive motor, and wherein a sliding switch for activating reversing operation of the drive motor is arranged on the housing.

Such a hand-held power tool having an associated housing and designed in the form of a baton-grip screwdriver is known from the prior art. The baton-grip screwdriver has, in its housing, a drive motor for driving an insertion tool, which can be arranged in an associated tool holder. The housing has a grip region with an operating element for activating the drive motor and with a sliding switch for activating reversing operation of the drive motor.

SUMMARY

The present disclosure relates to a hand-held power tool, in particular a screwdriver, having an elongate housing, in which is arranged a drive motor for driving an insertion tool, which can be arranged in an associated tool holder, wherein the housing has a grip region, in which is arranged at least one operating element for activating the drive motor, and wherein a sliding switch for activating reversing operation of the drive motor is arranged on the housing. A first activating unit is provided for activating the drive motor as a result of axial contact of the tool holder against a workpiece which is to be machined, and a second activating unit is provided for activating the drive motor as a result of activation of the operating element, wherein a selector is provided, and is designed to deactivate the first or second activating unit and/or to prioritize the first or second activating unit.

The disclosure therefore makes it possible to provide a hand-held power tool in which the selector can provide for reliable activation of the hand-held power tool. Undesired activation of the hand-held power tool can thus be prevented in a straightforward and uncomplicated manner.

The selector preferably performs prioritization in dependence on a first-actuated activating unit, wherein a higher priority is assigned to the first-actuated activating unit of the first or second activating unit. This is a straightforward way of providing for reliable operation of the hand-held power tool, wherein undesired activation of the second-actuated activating unit can be prevented.

The selector is preferably designed to deactivate the activating unit not given higher priority. Prioritization can thus be achieved easily and without complication.

According to one embodiment, the selector is designed to activate both activating units. This can provide for alternative operation which uses both activating units and can make it easier for in particular skilled users to operate in awkward and/or cramped surroundings.

In the case of exclusive activation of one of the first or second activating units over a comparatively long period of actuation, the respectively other activating unit of the first or second activating unit is preferably deactivated by the selector. This is a straightforward way of selecting a desired activating unit for use in each case.

The comparatively long period of actuation is preferably at least 3 seconds. This can provide for reliable activation of the selected activating unit.

The housing is preferably assigned a first and a second possible grip position. This makes it possible to select a suitable possible grip position when a workpiece is being machined by the hand-held machine tool.

The operating element and the sliding switch are preferably arranged so as to allow a user to actuate them using one finger, in particular a thumb. This can provide for easy and uncomplicated handling and operation of the hand-held power tool.

The operating element and the sliding switch are preferably arranged at an axial end of the elongate housing which is directed away from the tool holder. This makes it possible to provide a reliable arrangement with convenient possible operation.

Contact, in particular axial contact, of the tool holder measuring at least 0.1 Nm preferably activates the drive motor. This can provide for reliable activation of the drive motor, wherein the specified torque of at least 0.1 Nm can prevent undesired activation, e.g. as a result of contact when an insertion tool is being arranged in the tool holder.

BRIEF DESCRIPTION OF THE DRAWINGS

The disclosure will be explained in more detail in the following description with reference to exemplary embodiments illustrated in the drawings, in which.

DETAILED DESCRIPTION

Figure 1:
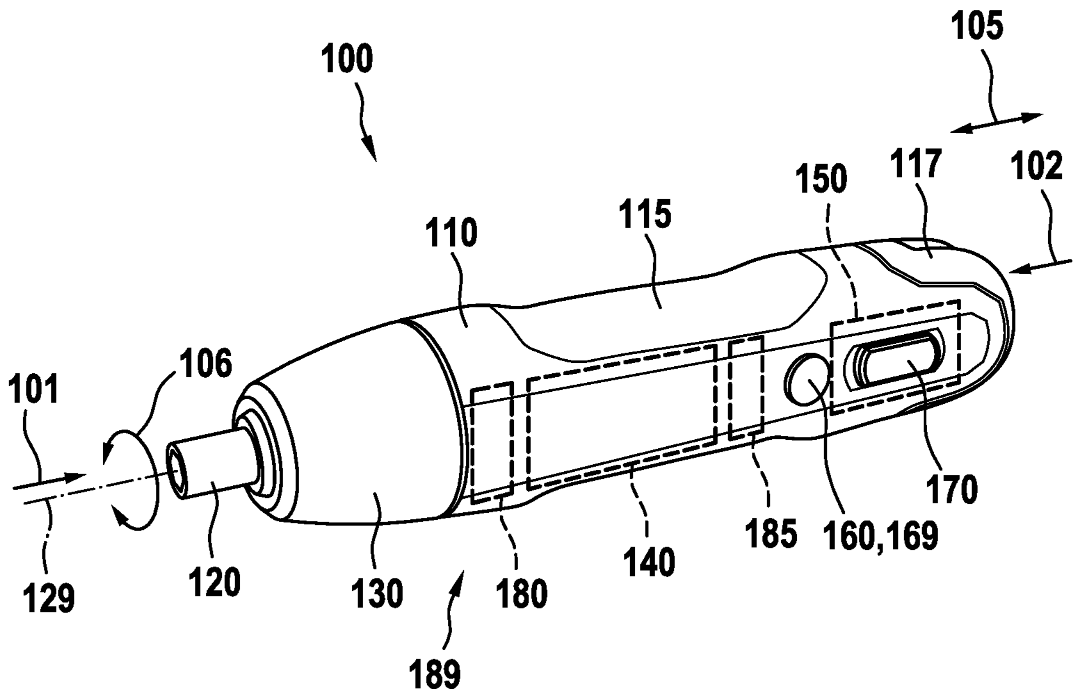
FIG. 1 shows a side view of a hand-held power tool according to the disclosure as seen from a first side.

FIG. 1 shows an example of a hand-held power tool 100 which, for the purposes of illustration here, has an elongate housing 110. The hand-held power tool 100 is preferably designed in the form of a screwdriver, in particular in the form of a baton-grip screwdriver. According to one embodiment, the hand-held power tool 100 can be connected mechanically and electrically to a power-supply unit 150, in order for power to be supplied independently of mains power. The power-supply unit 150 is preferably designed in the form of a rechargeable-battery pack.

The elongate housing 110 preferably has arranged in it at least one drive motor 140 for driving a tool holder 120. An insertion tool, e.g. a screwdriver bit or a drill bit, can preferably be arranged in the tool holder 120.

The elongate housing 110 preferably has a cylindrical main body having a first axial end 101 and a second axial end 102, which is located opposite the first end, wherein the first axial end 101, by way of example, is directed towards the tool holder 120. For the purposes of illustration here, a longitudinal direction 105 of the elongate housing 110 is formed between the first and second axial ends 101, 102. The tool holder 120 is preferably assigned an axis of rotation 129. Furthermore, the elongate housing 110 has a circumferential direction 106.

In the case of the hand-held power tool 100 which is shown in FIG. 1, the tool holder 120, the drive motor 140, and also the housing 110 with its grip region 115 and the cover 117, are arranged along a common axis of rotation, preferably the axis of rotation 129 of the tool holder 120. It is preferably the case that all the elements of the hand-held power tool 100 are arranged in the elongate housing 110. It is therefore also the case that, in contrast to a hand-held power tool having a pistol-form housing in which the rechargeable-battery pack is arranged perpendicularly to the drive motor, this being well known from the prior art, the rechargeable-battery pack 150 of the present disclosure is preferably likewise arranged in the housing 110.

The elongate housing 110 preferably has a grip region 115, in which is arranged at least one operating element 160 for activating the drive motor 140. Also preferably provided is a sliding switch 170 which, for the purpose of activating reversing operation of the drive motor 140, is arranged on the housing 110. It is likewise the case that the housing 110 has a torque-adjustment sleeve 130 preferably at its axial end 101, which is directed towards the tool holder 120. In addition, a cover 117 is preferably arranged at the axial end 102 of the elongate housing 110, said axial end being directed away from the tool holder 120.

Figure 3:
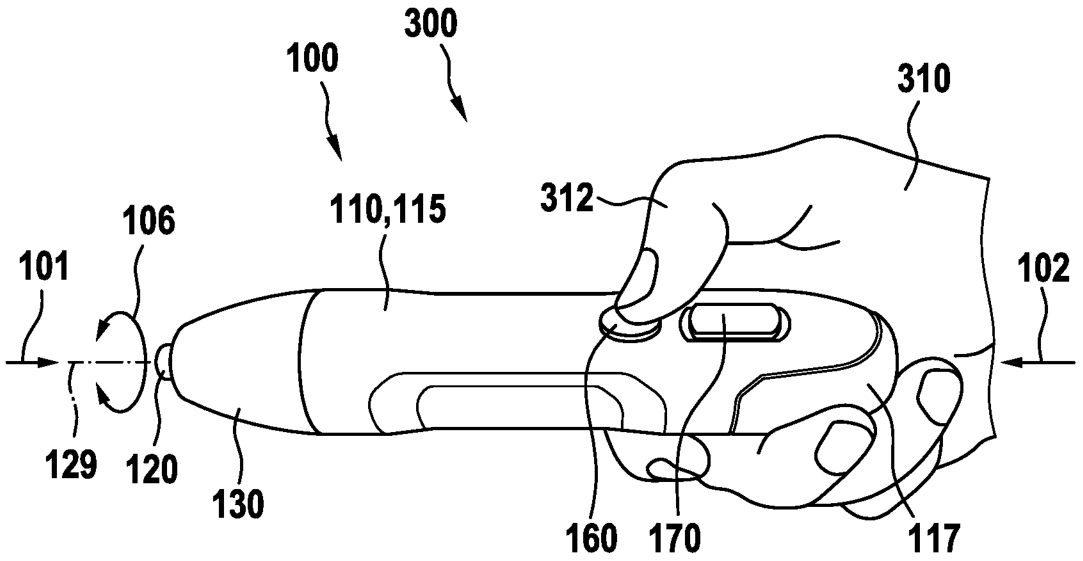
FIG. 3 shows a plan view of the hand-held power tool from FIGS. 1 and 2 in a first possible grip position.

In addition, preferably in order for the grip region 115 to be formed ergonomically, or in order for an ergonomic grip region to be formed, to provide for a first and second possible grip position (300 in FIG. 3; 400 in FIG. 4) of the elongate housing 110, the sliding switch 170 and the operating element 160 are arranged in the vicinity of one another in the longitudinal direction 105 of the elongate housing 110 such that the operating element 160 and the sliding switch 170 can be operated using one finger (312 in FIG. 3). The operating element 160 and the sliding switch 170 here are arranged preferably at the axial end 102 of the housing 110, said axial end being directed away from the tool holder 120.

One embodiment provides a first activating unit 189 for activating the drive motor 140 as a result of contact of the tool holder 120 against a workpiece which is to be machined. Corresponding axial contact of the tool holder 120, i.e. contact in the axial direction, takes place preferably in the longitudinal direction 105 against the workpiece which is to be machined. Preferably contact, in particular axial contact, of the tool holder 120 here measuring at least 0.1 Nm activates the drive motor 140. It is generally the case in the present description that the term "axial" or the expression "in the axial direction" is understood to mean a direction in the longitudinal direction 105 of the housing 110, in particular a direction parallel to the axis of rotation 129 of the tool holder 120. A pressure switch 185 is preferably formed between the drive motor 140 and the rechargeable-battery pack 150. The pressure switch 185 is preferably assigned to the first activating unit 189. The pressure switch 185 is preferably actuated or activated as a result of contact of the tool holder 120 against the workpiece which is to be machined.

Furthermore, the first activating unit 189 is preferably assigned a spring unit 180 between the torque-adjustment sleeve 130 and the drive motor 140. Upon contact of the tool holder 120 against a workpiece which is to be machined, the spring unit 180 here is compressed until a predetermined limit value, in the present case 0.1 Nm, has been exceeded and the pressure switch 185 is displaced in the direction of the second axial end 102 of the housing 110, as a result of which activation takes place.

Additionally provided is preferably a second activating unit 169 for activating the drive motor 140 as a result of actuation of the operating element 160. The drive motor 140 is preferably activated by the first or second activating unit 189, 169. A selector (1710 in FIG. 18) is preferably provided, and is designed to deactivate the first or second activating unit 189, 169 and/or to prioritize the first or second activating unit 189, 169.

The operating element 160 is preferably arranged transversely, in particular perpendicularly, to the axis of rotation 129 of the tool holder 120. The drive motor 140 is preferably activated by radial actuation or activation of the operating element 160, or by axial contact of the tool holder 120. Radial actuation or activation of the operating element 160 here is understood to mean activation in the radial direction of the housing 110, or activation in a direction perpendicular to the axis of rotation 129. Furthermore, axial contact of the tool holder 120 is understood to mean contact in the axial direction or longitudinal direction 105 of the housing 110, wherein the longitudinal direction 105 is formed parallel to the axis of rotation 129.

In an example of the operation of the hand-held power tool 100, it is preferably the case that, in a first step, a direction of rotation of the drive motor 140 is set via the sliding switch 170. It is then preferably the case that the drive motor 140 is activated via the operating element 160 or as a result of contact, in particular axial contact, of the tool holder 120 against a workpiece which is to be machined.

Figure 2:
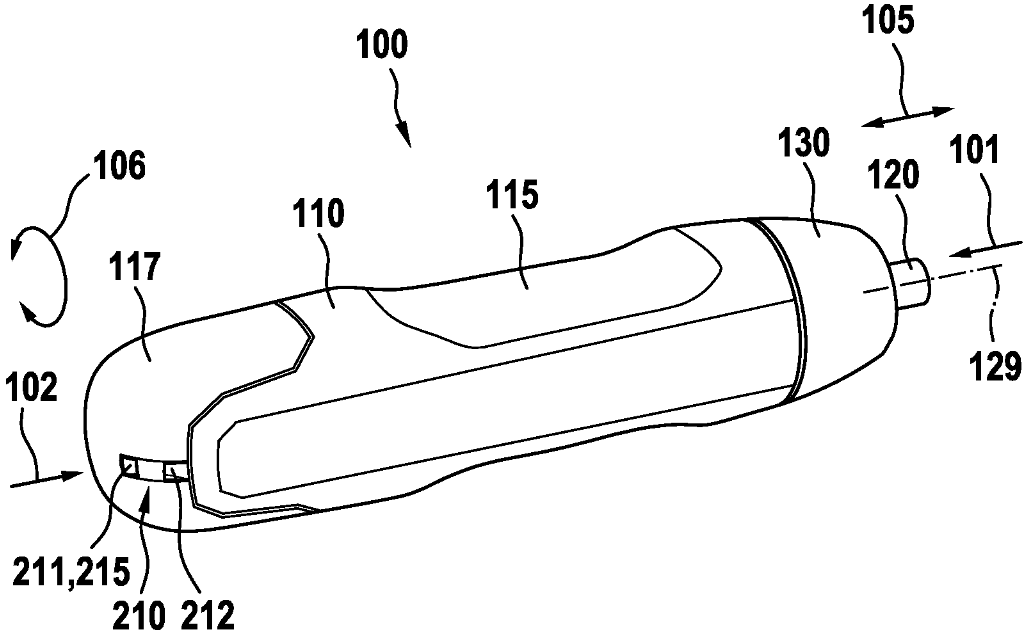
FIG. 2 shows a side view of the hand-held power tool according to the disclosure from FIG. 1 as seen from a second side, which is located opposite the first side.

FIG. 2 shows the hand-held power tool 100 from FIG. 1 in a view in which the tool has been rotated through 180° about the axis of rotation 129. FIG. 2 here depicts the cover 117 of the elongate housing 110.

One embodiment provides a theft-prevention device 210, by means of which at least the housing 110 can be secured against theft. It is preferably the case that the entire hand-held power tool 100 is secured against theft by the theft-prevention device 210.

Figure 12:
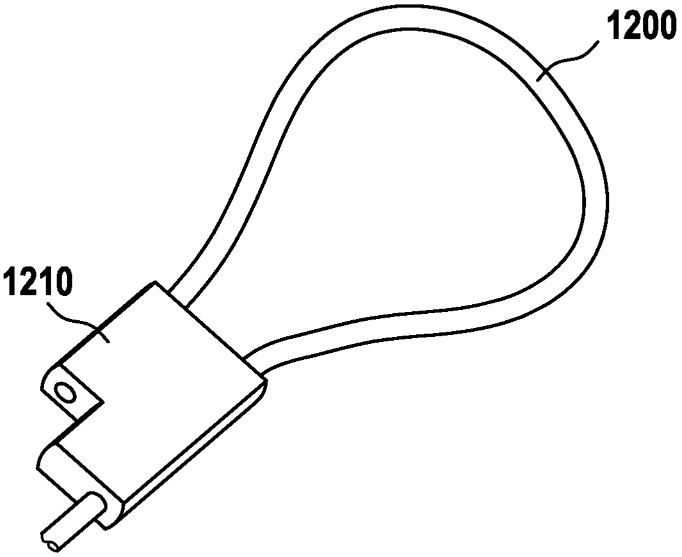
FIG. 12 shows a perspective plan view of a theft-prevention device.

The theft-prevention device 210 is preferably assigned a cable-like theft safeguard (1200 in FIG. 12). The cable-like theft safeguard (1200 in FIG. 12) is fixed in a preferably tunnel-like holder 215 on the housing 110. The tunnel-like holder 215 preferably has a first access 211 and a second access 212. The first access 211 of the tunnel-like holder 215 here was arranged in the longitudinal direction 105 of the housing 110, parallel to the drive motor 140.

The theft-prevention device 210 is preferably arranged at the end 102 of the housing 110, said end being directed away from the tool holder 120. In particular, the theft-prevention device 210 is assigned to the cover 117 of the hand-held power tool 100 or of the housing 110.

The holder 215 is preferably arranged at the end 102 of the housing 110, said end being directed away from the tool holder 120. It is preferable here for the holder 215 to be formed in the cover 117. According to one embodiment here, the holder 215 is arranged in a wall (1505 in FIG. 15) of the cover 117.

FIG. 3 shows the hand-held power tool 100 from FIGS. 1 and 2 in a first possible grip position 300. The housing 110 is preferably designed so that, in the first possible grip position 300, a user holds it in one hand 310 at the axial end 102, which is directed away from the tool holder 120. The second axial end 102 of the housing 110 here allows the user to use his hand 310 to grip around it such that the user's thumb 312 is oriented at least more or less in the direction of the tool holder 120, or is positioned at least to some extent closer to the tool holder 120 than the rest of the fingers of the hand 310. It is preferably the case, in the first possible grip position 300, that the thumb 312 is oriented at least more or less parallel to the axis of rotation 129 of the tool holder 120 and the rest of the fingers of the user's hand 310 are arranged at least more or less in the circumferential direction 106 of the housing 110. For the purposes of illustration here, and preferably, the thumb 312 in FIG. 3 is arranged on the operating element 160.

Figure 4:
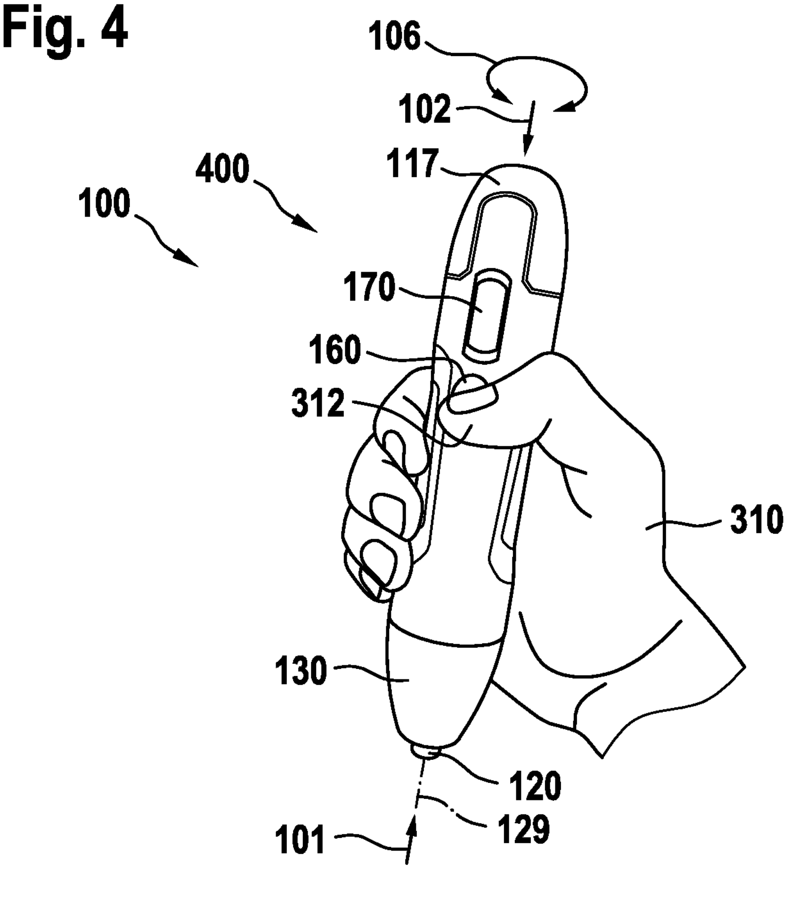
FIG. 4 shows a plan view of the hand-held power tool from FIGS. 1 to 3 in a second possible grip position.

FIG. 4 shows the hand-held power tool 100 from FIGS. 1 to 3 in a second possible grip position 400. The housing 110 is preferably designed so that, in the second possible grip position 400, a user holds it in his hand 310 along the grip region 115 between the tool holder 120 and the end 102, which is directed away from the tool holder 120. The grip region 115 here, in the second possible grip position 400, allows the user to use his hand 310 to grip around it such that the thumb 312 of the hand 310 is oriented in the direction of the axial end 102, which is directed away from the tool holder 120, or is positioned at least to some extent closer to the axial end 102, which is directed away from the tool holder 120, than the rest of the fingers of the hand 310. It is preferably the case here that the thumb 312 of the hand 310 is arranged at least more or less perpendicularly to the axis of rotation 129 of the tool holder 120, and the rest of the fingers of the hand 310 are arranged on the housing 110, at least more or less in the circumferential direction 106 of the housing 110. For the purposes of illustration here, and preferably, the thumb 312 of the hand 310 in FIG. 4 is arranged on the operating element 160 of the hand-held power tool 100.

Figure 5:
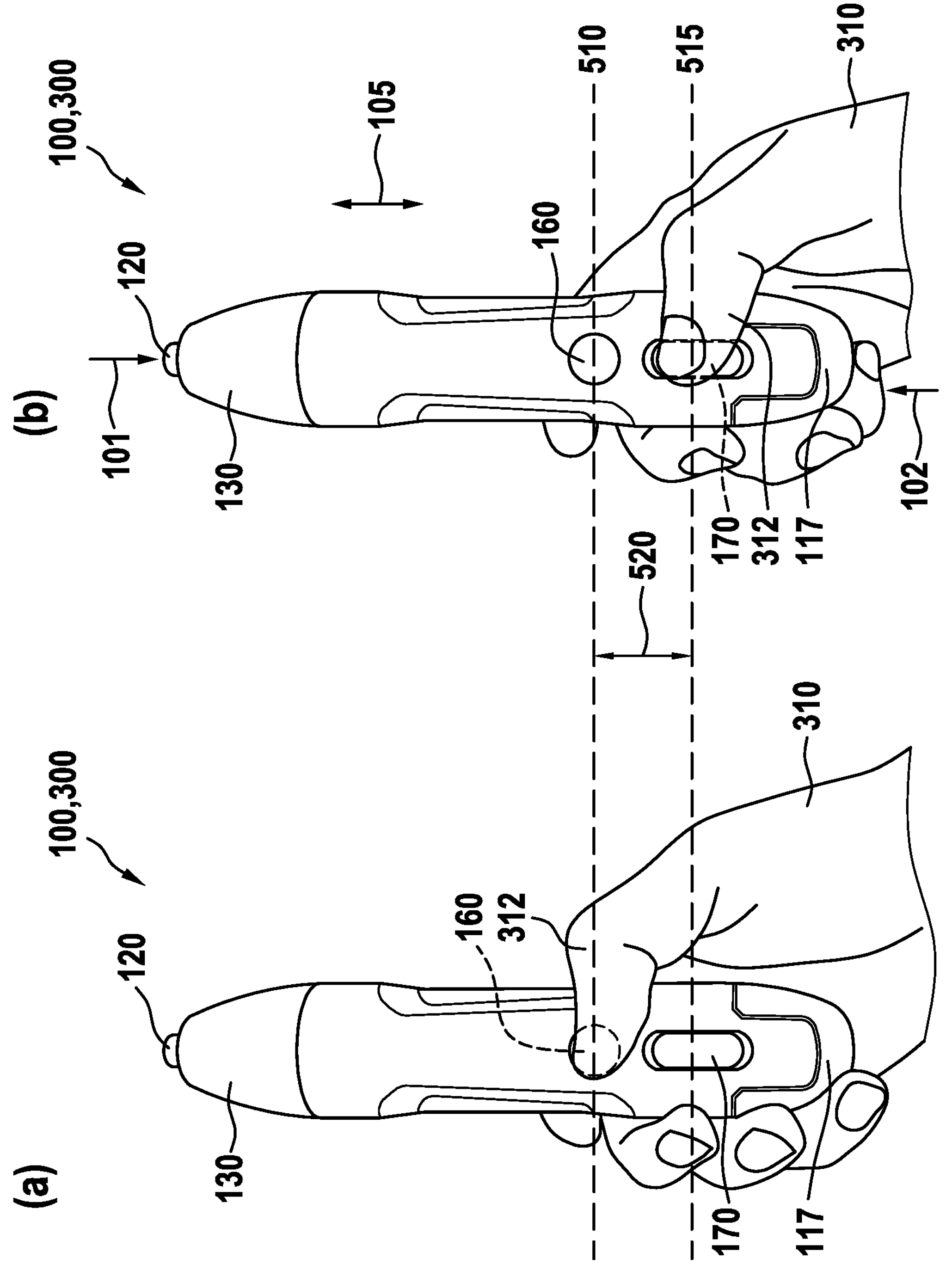
FIG. 5 shows a plan view of the hand-held power tool from FIG. 3 upon actuation of an operating element and of a sliding switch.

FIG. 5 shows the hand-held power tool 100 in the first possible grip position 300 from FIG. 3, wherein a left-hand part (a) of the illustration depicts the thumb 312 of the hand 310 arranged on the operating element 160 and a right-hand part (b) of the illustration depicts the thumb 312 of the hand 310 arranged on the sliding switch 170. According to one embodiment, the operating element 160 and the sliding switch 170 are designed to allow a user to actuate them using one finger, in particular a thumb 312, of one hand 310. For this purpose, the operating element 160 and the sliding switch 170, as described above, are arranged in the vicinity of one another, i.e. at a comparatively small distance apart from one another, in the longitudinal direction 105 of the housing 110.

A distance 520 is preferably formed between the operating element 160 and the sliding switch 170, as seen in the longitudinal direction 105 of the housing 110. The distance 520 is preferably at least essentially 35 mm, particularly preferably 30 mm. The distance 520 here is preferably formed between a centre line 510 and a centre line 515 of the hand-held power tool 100, wherein the centre line 510 is assigned to the operating element 160 and the centre line 515 is assigned to the sliding switch 170. The centre lines 510, 515 here are arranged centrally on the respective operating element 160 and sliding switch 170, as seen in the longitudinal direction 105. The centre line 515 is preferably arranged in the centre of the sliding switch 170 when the latter is in a rest position or neutral position.

Figure 6:
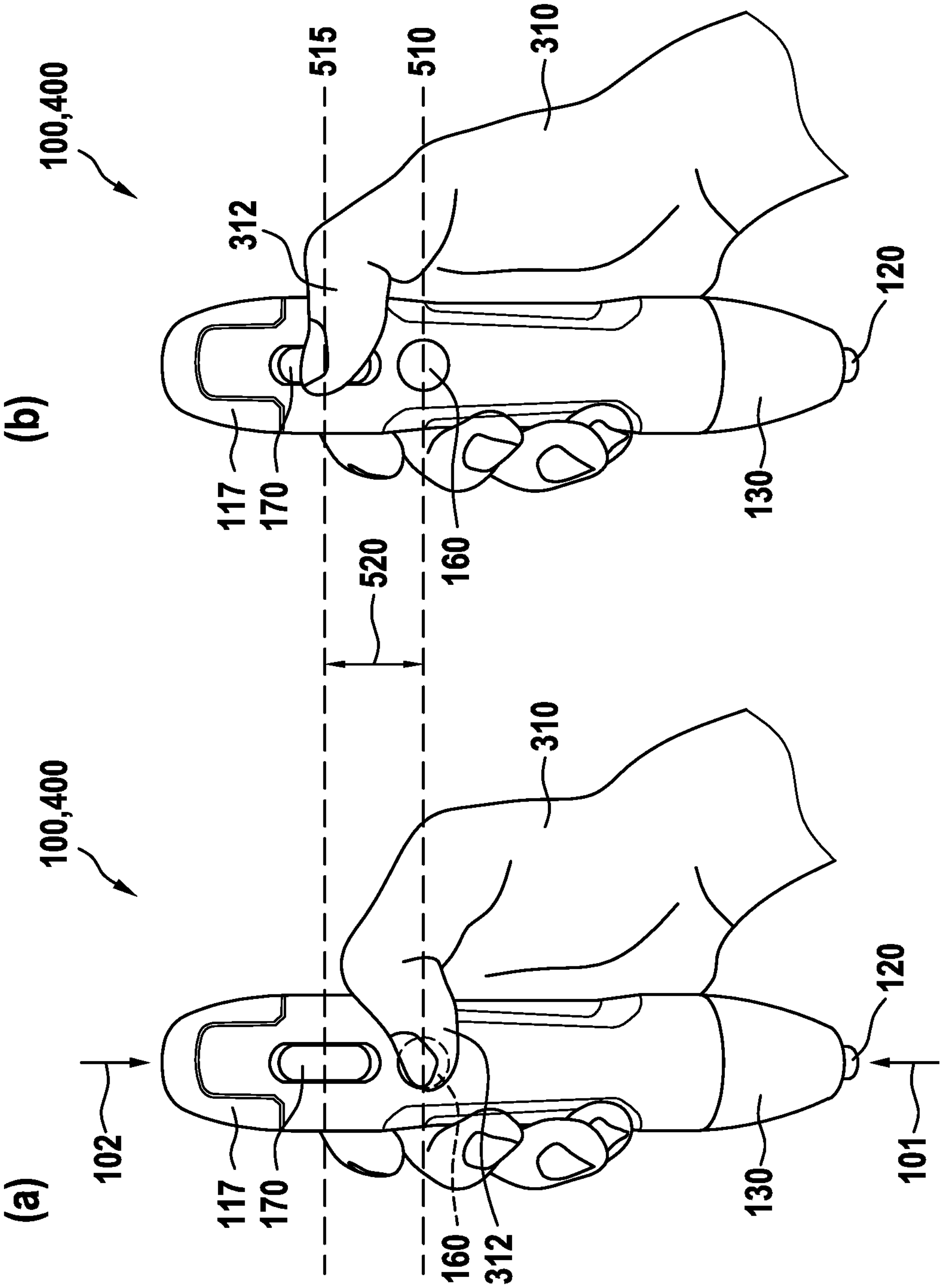
FIG. 6 shows a plan view of the hand-held power tool from FIG. 4 upon actuation of an operating element and of a sliding switch.

FIG. 6 shows the hand-held power tool 100 in the second possible grip position 400 from FIG. 4, wherein a left-hand part (a) of the illustration depicts the thumb 312 of the hand 310 arranged on the operating element 160 and a right-hand part (b) of the illustration depicts the thumb 312 of the hand 310 arranged on the sliding switch 170. Furthermore, FIG. 6 shows the centre lines 510 and 515 in order to depict the distance 520 between the two operating elements, or between the operating element 160 and the sliding switch 170.

It is pointed out that the arrangement of the user's hand 310 on the hand-held power tool 100 in the first and second possible grip positions 300, 400 is given merely by way of example and should not be considered to be limiting to the disclosure. It is thus also possible for any other desired finger of one hand 310, e.g. an index finger, to actuate the operating element 160 and/or the sliding switch 170.

Figure 7:
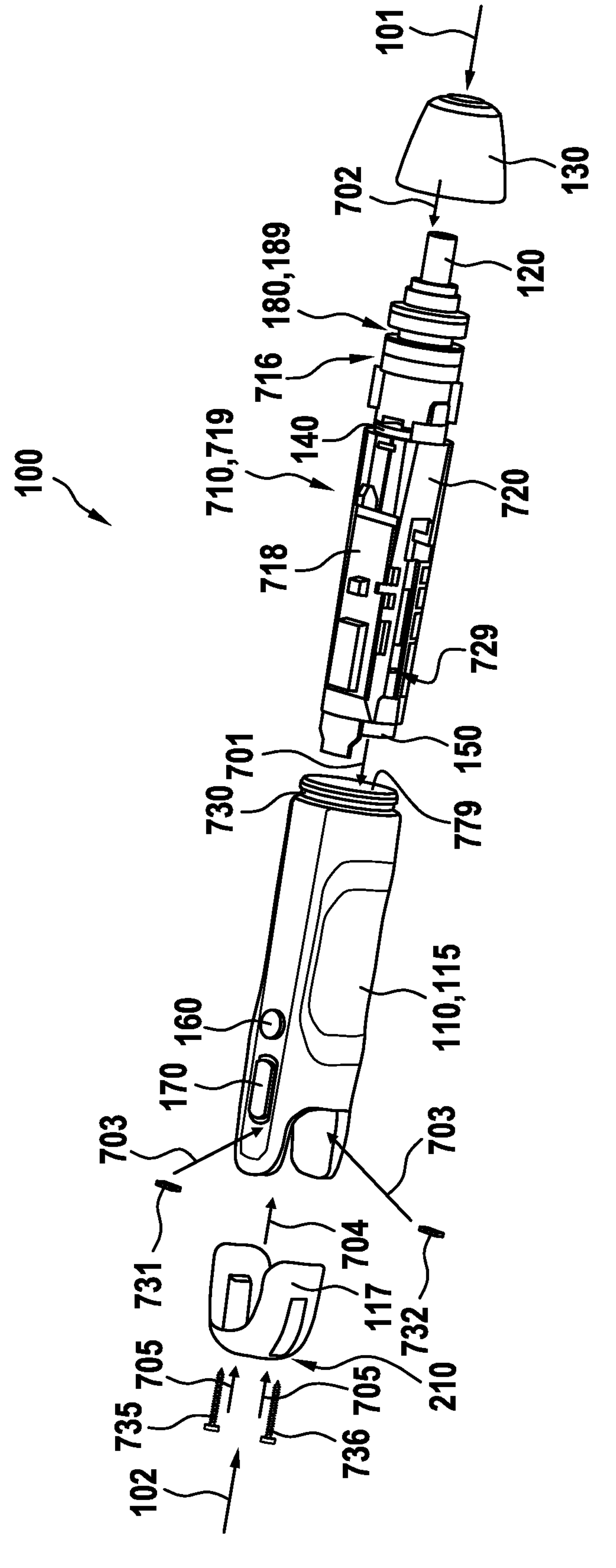
FIG. 7 shows an exploded view of the hand-held power tool from FIGS. 1 to 6.

FIG. 7 shows the hand-held power tool 100 from FIGS. 1 to 6 and depicts a drive unit 710 of the hand-held power tool 100. The drive unit 710 preferably has at least the drive motor 140, drive electronics 718 and the power-supply unit 150. The drive unit 710 is optionally assigned a gear mechanism 716. The tool holder 120, the gear mechanism 716 and the drive unit 710 are arranged preferably along the axis of rotation 129 of the tool holder 120, in particular axially.

The drive unit 710 is preferably arranged in a drive-unit housing 720. The drive electronics 718 and the power-supply unit 150 are preferably arranged parallel to one another in the drive-unit housing 720.

The drive-unit housing 720 is preferably arranged in the housing 110. The drive-unit housing 720 is preferably arranged in an inner holder 779 of the housing 110. The drive unit 710 preferably forms an installation subassembly

719 with the drive-unit housing 720. This installation subassembly 719 is preferably arranged in the housing 110 of the hand-held power tool 100. The housing 110 accommodates preferably the drive-unit housing 720 or the installation subassembly 719 at least in a form-fitting manner.

In addition, preferably at least one pin is, for the purposes of illustration here and preferably two pins 731, 732 are, provided, and these secure the drive-unit housing 720 in the housing 110 in the axial direction or in the longitudinal direction 105 of the housing 110. The pins 731, 732 preferably engage in a securing aperture 729 in the drive-unit housing 720.

The optional gear mechanism 716 preferably provides for torque-adjustment purposes, wherein it is possible to adjust dissipation of a torque to the tool holder 120. Adjustment of a desired torque preferably takes place here via the torque-adjustment sleeve 130. Such a torque-adjustment sleeve 130 is well known from the prior art, and therefore, in order to keep the description concise, a detailed description thereof will not be given here. It is preferably the case that the tool holder 120 and the gear mechanism 716 are arranged, at least in part, in the torque-adjustment sleeve 130.

Furthermore, FIG. 7 depicts an example of the way in which the hand-held power tool 100 is assembled. First of all, the drive unit 710 is installed in the drive-unit housing 720 in order to form the installation subassembly 719. In a further step, the installation subassembly 719, or the drive-unit housing 720, is pushed into the inner holder 779 of the housing 110 in the direction of an arrow 701. Then, the torque-adjustment sleeve 130 is arranged at the axial end 101 of the housing 110, said axial end being directed towards the tool holder 120. For this purpose, the torque-adjustment sleeve 130 is positioned in an accommodating region 730 of the housing 110 in the direction of an arrow 702. Furthermore, the drive unit 710 or the installation subassembly 719 is fixed via the pins 731, 732, which are arranged in the inner holder 779 of the housing 110 in the direction of arrows 703. Then, the cover 117 is installed at the second axial end 102 of the housing 110, in the direction of an arrow 704, and is fastened on the housing 110 via fastening elements 735, 736. The fastening elements 735, 736 are preferably designed in the form of screws. The screws 735, 736 are screwed into the cover 117 in the direction of arrows 705. It is pointed out that the cover 117 can also be arranged, in particular fastened, on the housing 110 via any other desired connection, e.g. a clamping and/or latching connection.

Figure 8:
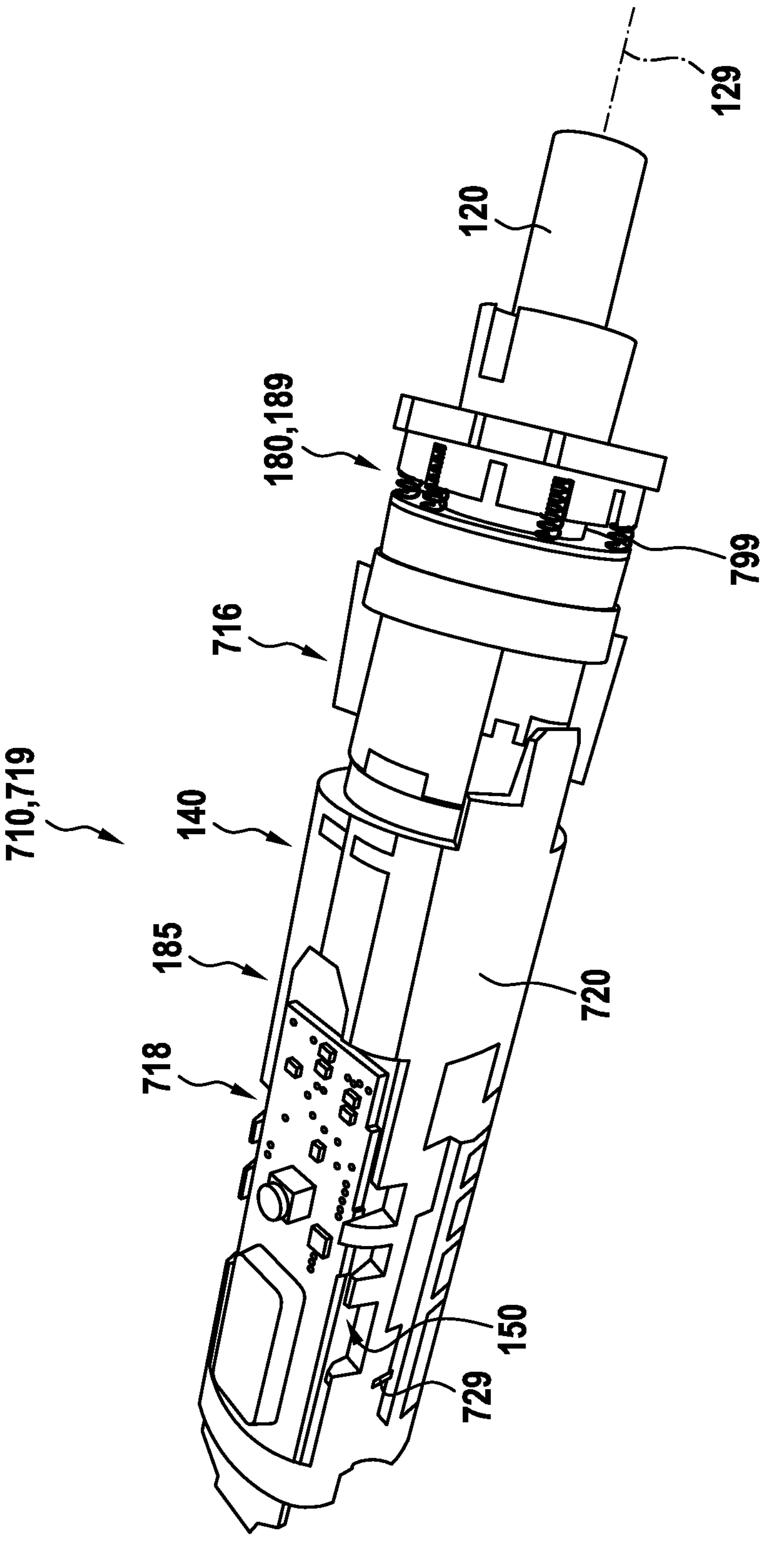
FIG. 8 shows a plan view of a drive unit which is assigned to the hand-held power tool from FIGS. 1 to 7.

FIG. 8 shows the installation subassembly 719 from FIG. 7 and depicts the arrangement of the drive electronics 718, of the power-supply unit 150, of the drive motor 140 and also of the optional gear mechanism 716 in the drive-unit housing 720. For the purposes of illustration here, in FIG. 8, the gear mechanism 716 is assigned to the drive unit 710, i.e. the gear mechanism 716 is not arranged in the drive-unit housing 720. However, it is pointed out that it is also possible for the gear mechanism 716 to be arranged in the drive-unit housing 720 or within the drive-unit housing 720. In addition, FIG. 8 depicts the first activating unit 189, wherein the tool holder 120 is prestressed elastically via spring elements 799 and is arranged for movement in the axial direction of the housing 110 or in the longitudinal direction 105. It is possible here for a preferably axial movement of the tool holder 120 in the direction of the drive motor 140 to activate the drive motor 140 via the pressure switch 185. The drive electronics 718 preferably have a printed circuit board with electronic components, such as, for example, switching elements.

Figure 9:
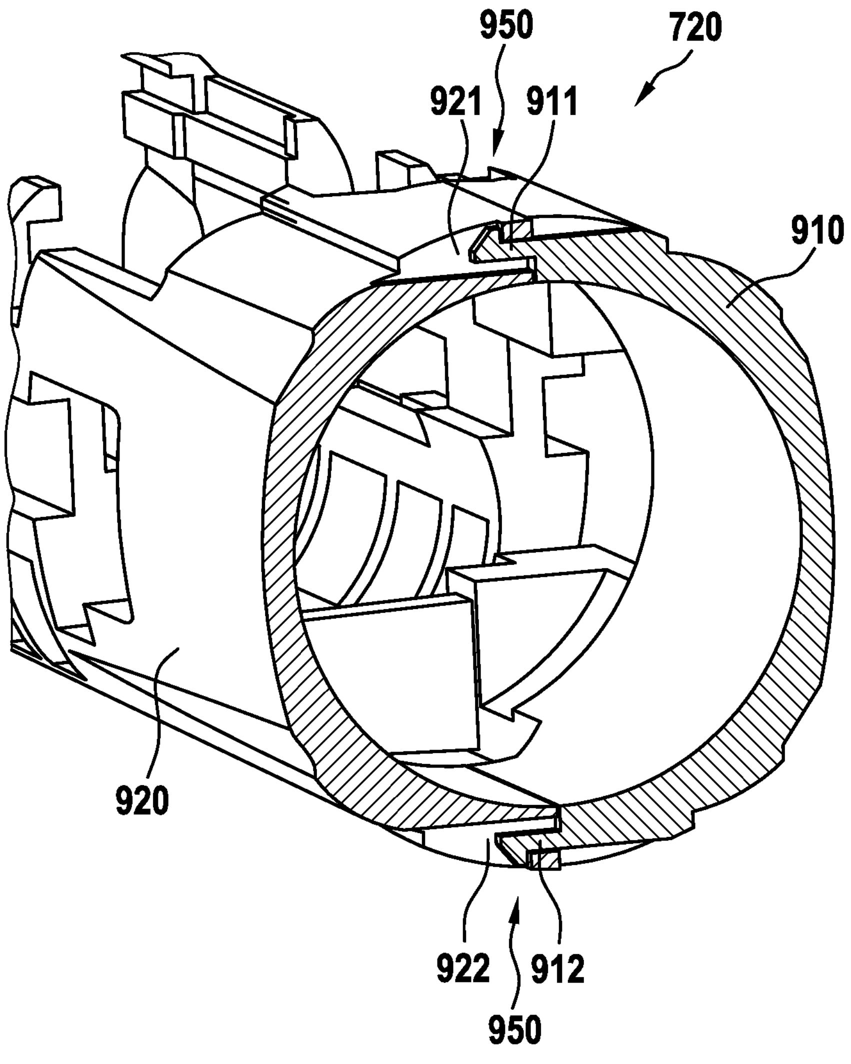
FIG. 9 shows a plan view of a drive-unit housing which is assigned to the drive unit from FIG. 8.

FIG. 9 shows the drive-unit housing 720 of the hand-held power tool 100 from FIG. 7. According to one embodiment, the drive-unit housing 720 from FIGS. 7 and 8 is designed in the form of a half-shell housing with at least two shells, in particular half-shells 910, 920. The two half-shells 910, 920 are preferably connected to one another via a latching and/or clamping connection 950.

For the purposes of illustration here, the half-shell 910 has latching elements 911, 912 and the half-shell 920 has associated holders 921, 922. However, it is pointed out that, conversely, it is also possible for the half-shell 920 to have the latching elements 911, 912 and for the half-shell 910 to have the holders 921, 922.

The holders 921, 922 are preferably provided for accommodating the latching elements 911, 912 of the half-shell 910 and form the latching and/or clamping connection 950 therewith. For the purposes of illustration here, and preferably, the latching elements 911, 912 and the holders 921, 922 are arranged diametrically opposite one another.

However, it is pointed out that the formation of the connection between the two half shells 910, 920 via a latching and/or clamping connection 950 is given merely by way of example and should not be considered to be limiting to the present disclosure. It is thus also possible for the half-shells 910, 920 to be connected to one another via any other desired connection, e.g. via a plug-in connection, screw connection and/or a snap-fit connection. Furthermore, the drive-unit housing 720 can also have more than two shells 910, 920.

Figure 10:
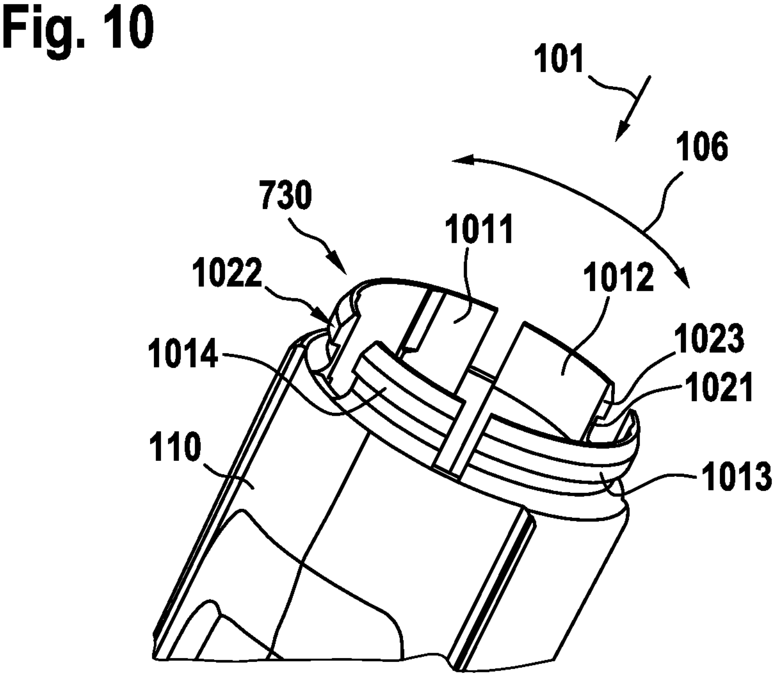
FIG. 10 shows a plan view of one end of a housing which is assigned to the hand-held power tool from FIG. 7.

FIG. 10 shows the housing 110 of the hand-held power tool 100 from FIG. 7 with its end 101, which is directed towards the tool holder 120, and the accommodating region 730 from FIG. 7. The accommodating region 730 preferably has a smaller diameter than the housing 110. On an outer circumference 1022, the housing 110 or the accommodating region 730 has, at least in part, a circumferential groove 1021 and also a latching hook 1023.

For the purposes of illustration here, and preferably, the accommodating region 730 in FIG. 10 has four circle-segment portions 1011, 1012, 1013, 1014 in the circumferential direction 106. However, it is pointed out that it is also possible for the accommodating region 730 to have more or fewer than four circle-segment portions.

The circle-segment portions 1011 to 1014 are preferably spaced apart from one another by an aperture formed in the axial direction of the housing 110. However, it is pointed out that the accommodating region 730 can also be of cylindrical design.

The circumferential groove 1021 and the latching hook 1023 are preferably designed to establish a snap-fit connection (1050 in FIG. 11) with the torque-adjustment sleeve 130. It is pointed out that an at least partially encircling circumferential groove 1021 is understood to mean a groove which is of encircling nature at least to some extent or is arranged only in certain parts and has interruptions. In particular, a partially encircling circumferential groove 1021 is a groove which is formed only in one circle segment of the circumference.

Figure 11:
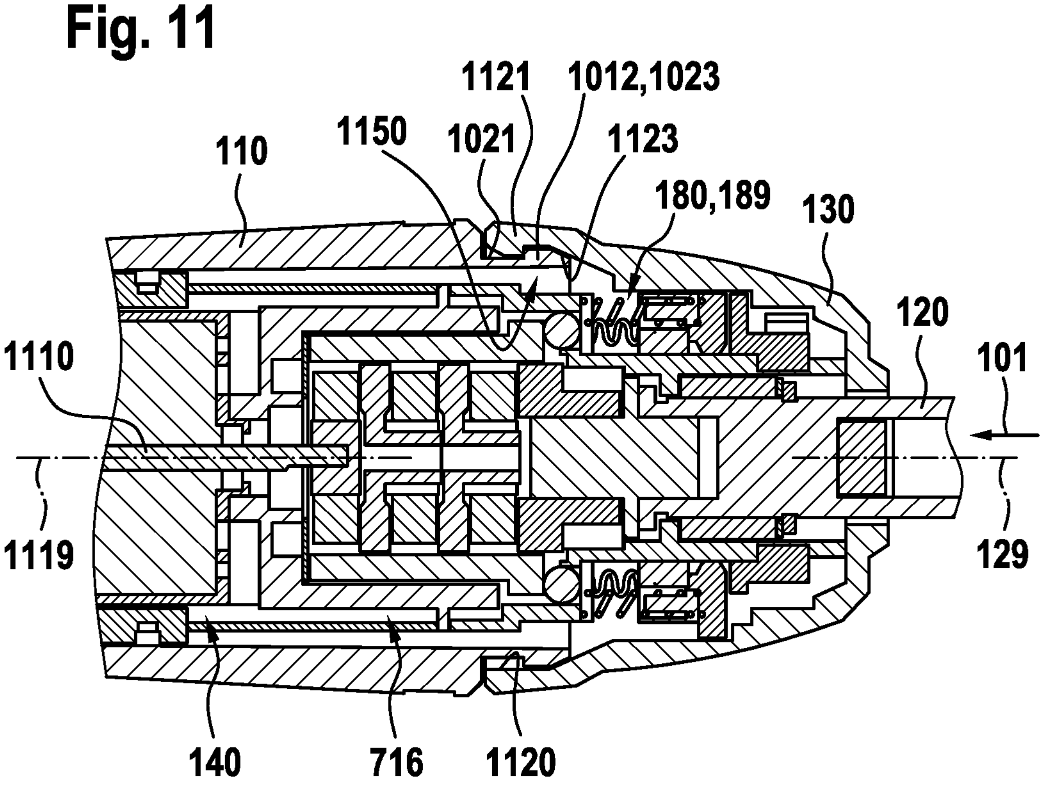
FIG. 11 shows a longitudinal section through a portion of the hand-held power tool from FIGS. 1 to 7.

FIG. 11 shows the housing 110 and the torque-adjustment sleeve 130 of the hand-held power tool 100 from FIGS. 1 to 7 and depicts a connection 1050 between the housing 110 and the torque-adjustment sleeve 130. The torque-adjustment sleeve 130 is preferably fixed at the first axial end 101 of the housing 110 in a rotatable manner via a snap-fit connection 1050. For this purpose, on its inner circumference 1120 the torque-adjustment sleeve 130 has an accommodating element 1121 for arranging in the circumferential groove 1021 of the housing 110 or of the accommodating region 730 of the housing 110. The snap-fit connection 1050 is preferably formed by the circumferential groove 1021 of the housing 110 and the accommodating element 1121 of the torque-adjustment sleeve 130. For the purposes of illustration here, and preferably, the torque-adjustment sleeve 130 has an accommodating element 1121, and also a holder 1123 for accommodating the accommodating elements 1023 of the housing 110 or of the accommodating region 730.

In addition, FIG. 11 depicts a drive shaft 1110 of the drive motor 140 and also a motor axis 1119, which is assigned to the drive shaft 1110. The axis of rotation 129 of the tool holder 120 and the motor axis 1119 preferably coincide with one another, i.e., at least within the confines of any production tolerances, there is no parallel or axial offset envisaged.

Furthermore, FIG. 11 depicts the optional gear mechanism 716 from FIG. 7, said gear mechanism being designed preferably in the form of a planetary gear mechanism. However, it is pointed out that the configuration of the gear mechanism 716 in the form of a planetary gear mechanism is given merely by way of example and should not be considered to be limiting to the present disclosure. Furthermore, the gear mechanism 716 is not restricted to the three gear stages illustrated; it is therefore also possible for the gear mechanism 716 to have more or fewer than three gear stages.

FIG. 12 shows a cable-like theft safeguard 1200, which is assigned to the theft-prevention device 210 from FIG. 2. The cable-like theft safeguard 1200 is preferably designed in the form of a wire cable. However, it is pointed out that it is also possible for the cable-like theft safeguard 1200 to be designed, for example, in the form of a cable, cord or the like and to consist of any desired material, e.g. plastic. In addition, the cable-like theft safeguard 1200 is assigned a clip 1210. The clip 1210 is preferably designed to form a loop with one end of the cable-like theft safeguard 1200.

Figure 13:
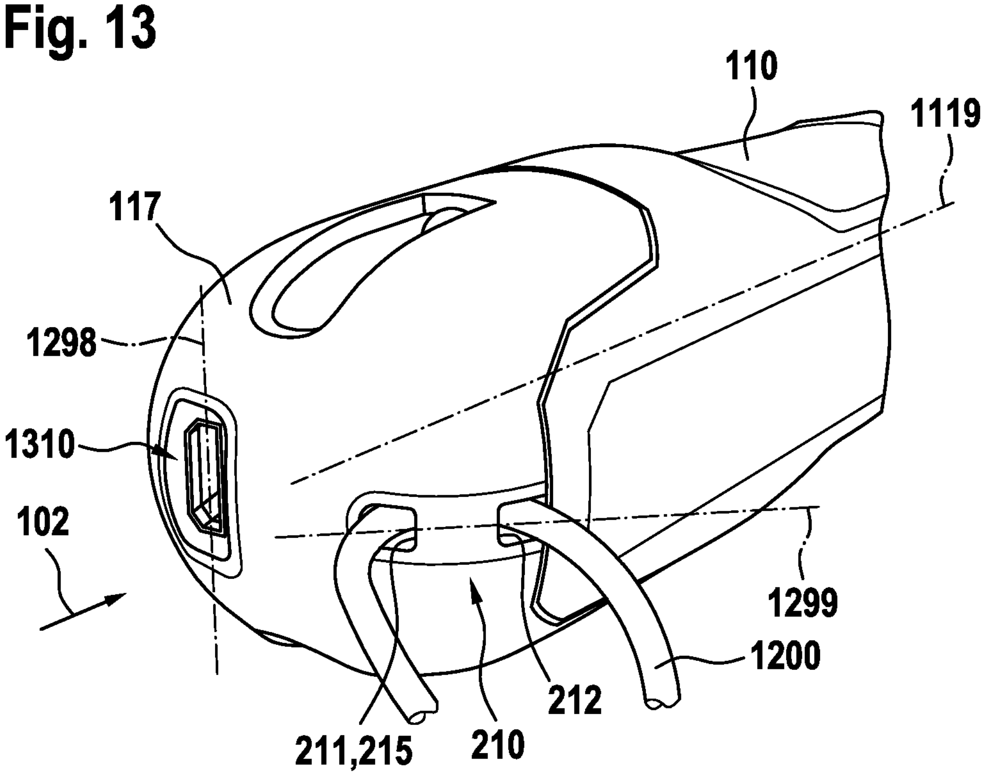
FIG. 13 shows a perspective view of one end of the hand-held power tool from FIGS. 1 to 7 with the theft-prevention device from FIG. 12.

FIG. 13 shows the second axial end 102 of the hand-held power tool 100 from FIGS. 1 to 7 with the housing 110 and the cover 117, and also with the motor axis 1119 according to FIG. 11. FIG. 13 here depicts the arrangement of the theft-prevention device 210 from FIG. 12 on the housing 110, or in the cover 117.

As described above, the theft-prevention device 210 has the holder 215 and also the first and second accesses 211, 212 of the holder 215. The cable-like theft safeguard 1200 here is preferably arranged in the holder 215. The first and second accesses 211, 212 are preferably arranged along an axis 1299. For the purposes of illustration here, and preferably, the axis 1299 is formed horizontally. This axis 1299 is preferably assigned to the tunnel-like holder 215. In addition, the axis 1299 is oriented essentially parallel to the motor axis 1119.

Furthermore, FIG. 13 provides, by way of example, a charging socket 1310, which is assigned preferably to the cover 117. The charging socket 1310 is assigned an axis 1298, which is oriented transversely, in particular perpendicularly, to the motor axis 1119. In addition, the axis 1298 is arranged perpendicularly to the axis 1299, or, for the purposes of illustration here, it is oriented vertically in FIG. 13. According to a further embodiment, the axis 1298 is assigned to the tunnel-like holder 215, which is oriented transversely, in particular perpendicularly, to the motor axis 1119. However, it is pointed out that the holder 215 can also be arranged at an angle between the axis 1299 and the axis 1298. The charging socket 1310 is preferably designed in the form of a USB charging socket.

Figure 14:
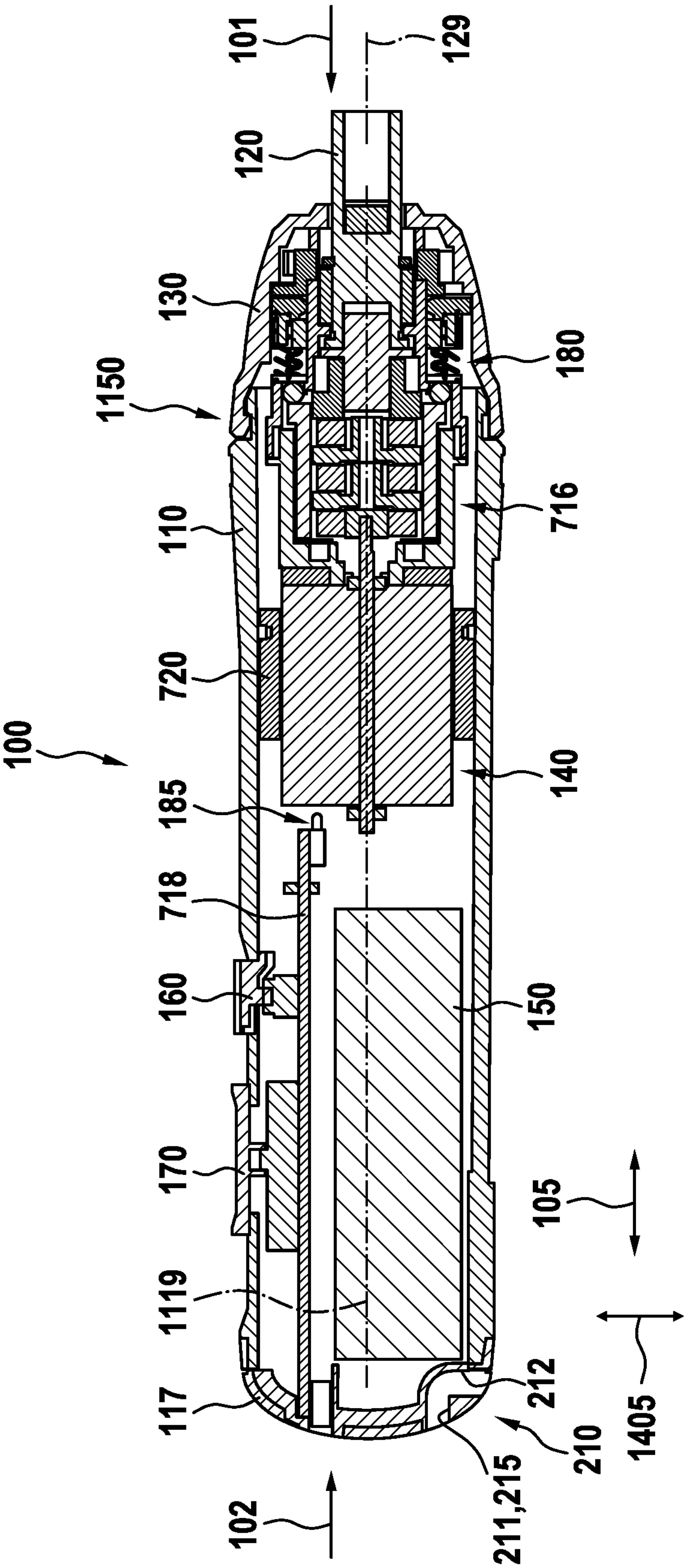
FIG. 14 shows a longitudinal section through the hand-held power tool from FIGS. 1 to 7.

FIG. 14 shows the hand-held power tool 100 from FIGS. 1 to 7 with the torque-adjustment sleeve 130 and the housing 110, in which are arranged the gear mechanism 716 from FIG. 7 and the drive motor 140, and also the power-supply unit 150 and the drive electronics 718, from FIG. 7. FIG. 14 depicts here the arrangement of the tunnel-like holder 215 in the cover 117. For the purposes of illustration here, the first access 211 of the tunnel-like holder 215 is arranged parallel to the motor axis 1119 of the drive motor 140, as seen in the longitudinal direction 105 of the housing 110. In addition, the second access 212 of the tunnel-like holder 215 is arranged in the transverse direction 1405 in relation to the motor axis 1119. According to one embodiment, the tunnel-like holder 215 is of arcuate design.

Figure 15:
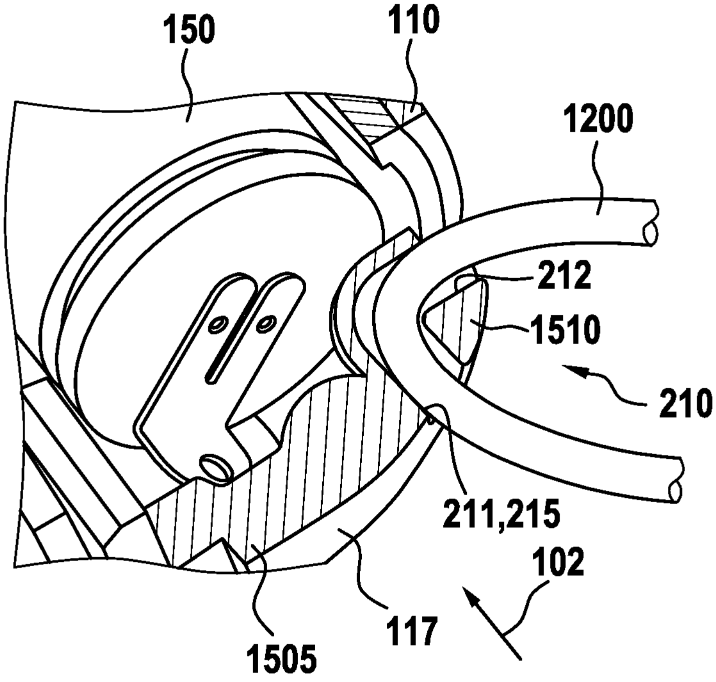
FIG. 15 shows a perspective plan view of a partial section through the hand-held power tool from FIG. 14 with a theft-prevention element.

FIG. 15 shows the second axial end 102 of the housing 110 from FIGS. 1 to 7 with the cover 117 and also the theft-prevention device 210 from FIG. 13, and depicts the first and second accesses 211, 212 of the tunnel-like holder 215. As described above, the holder 215 is formed in a wall 1505 of the cover 117. It is preferably the case that a portion 1510 is formed between the first and the second accesses 211, 212 of the holder 215. The portion 1510 has preferably an at least more or less triangular main body.

Figure 16:
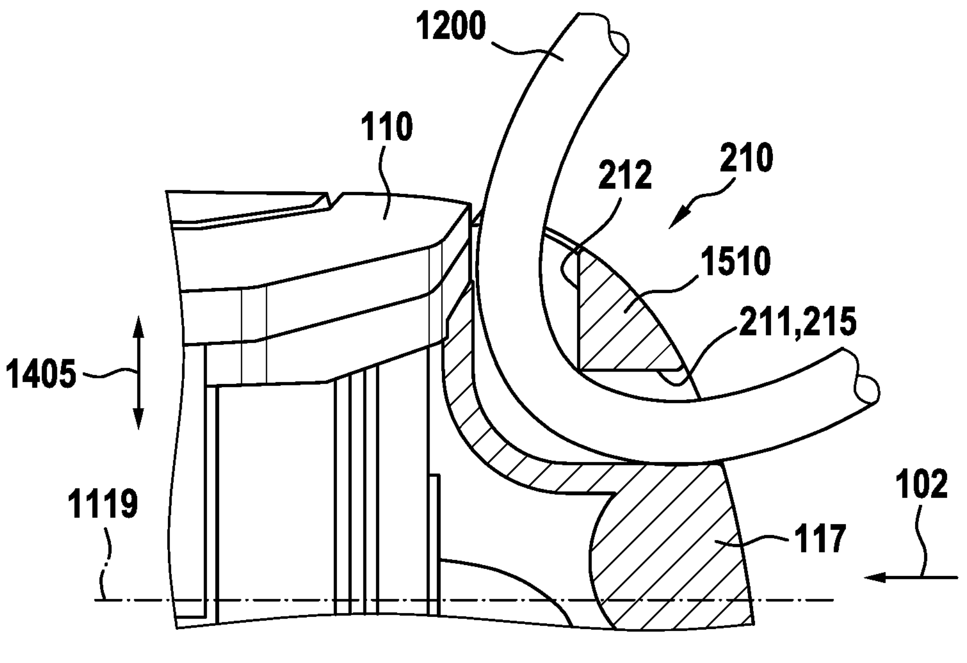
FIG. 16 shows a plan view of the partial section through the hand-held power tool with a theft-prevention element from FIG. 15.

FIG. 16 shows the cover 117 from FIG. 15 with the theft-prevention device 210 having the cable-like theft safeguard 1200. FIG. 16 here depicts the first access 211 of the holder 215, said access being formed parallel to the motor axis 1119, and also the second access 212 of the holder 215, said access being arranged in the transverse direction 1405 in relation to the motor axis 1119. In addition, FIG. 16 depicts the portion 1510. The portion 1510 preferably has a surface area of at least essentially 10 $mm^2$. The cable-like theft safeguard 1200 preferably has a diameter of 2 mm.

Figure 17:
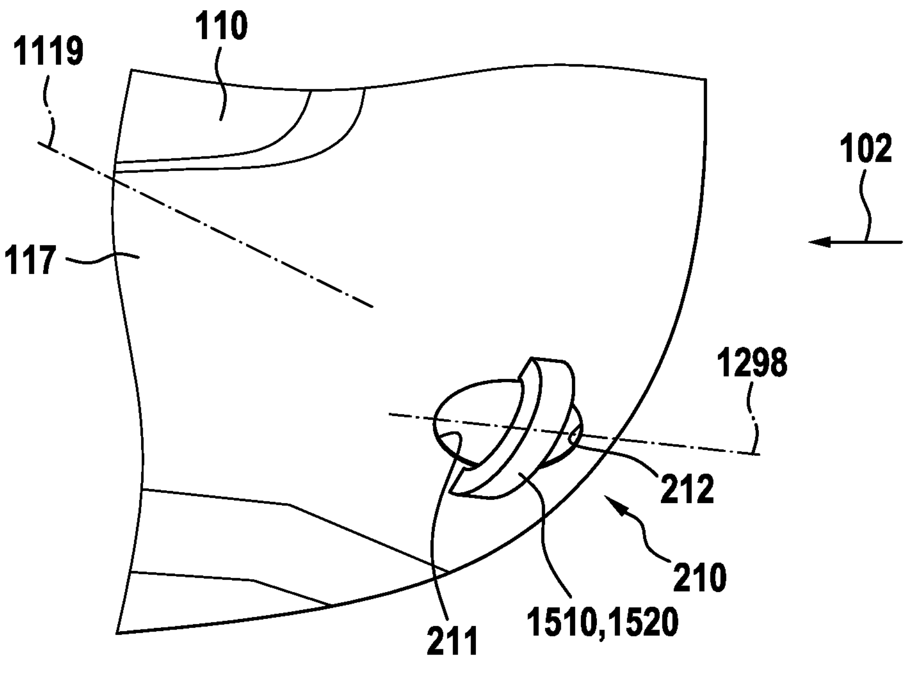
FIG. 17 shows a plan view of one end of the hand-held power tool from FIGS. 1 to 7 with an alternative holder for the theft-prevention device from FIG. 12.

FIG. 17 shows the second axial end 102 of the housing 110 from FIGS. 1 to 7 with the cover 117 and depicts an alternative arrangement of the theft-prevention device 210. The first and the second accesses 211, 212 here are preferably arranged on the axis 1298 and/or transversely, in particular perpendicularly, to the motor axis 1119. Furthermore, in FIG. 17, the portion 1510 is designed in the form of a crosspiece 1520. The crosspiece 1520 is preferably formed on the cover 117. The crosspiece 1520 here forms an arcuate portion. In contrast to the portion 1510 from FIGS. 13 to 16, the crosspiece 1520 is arranged outside the holder 215.

Figure 18:
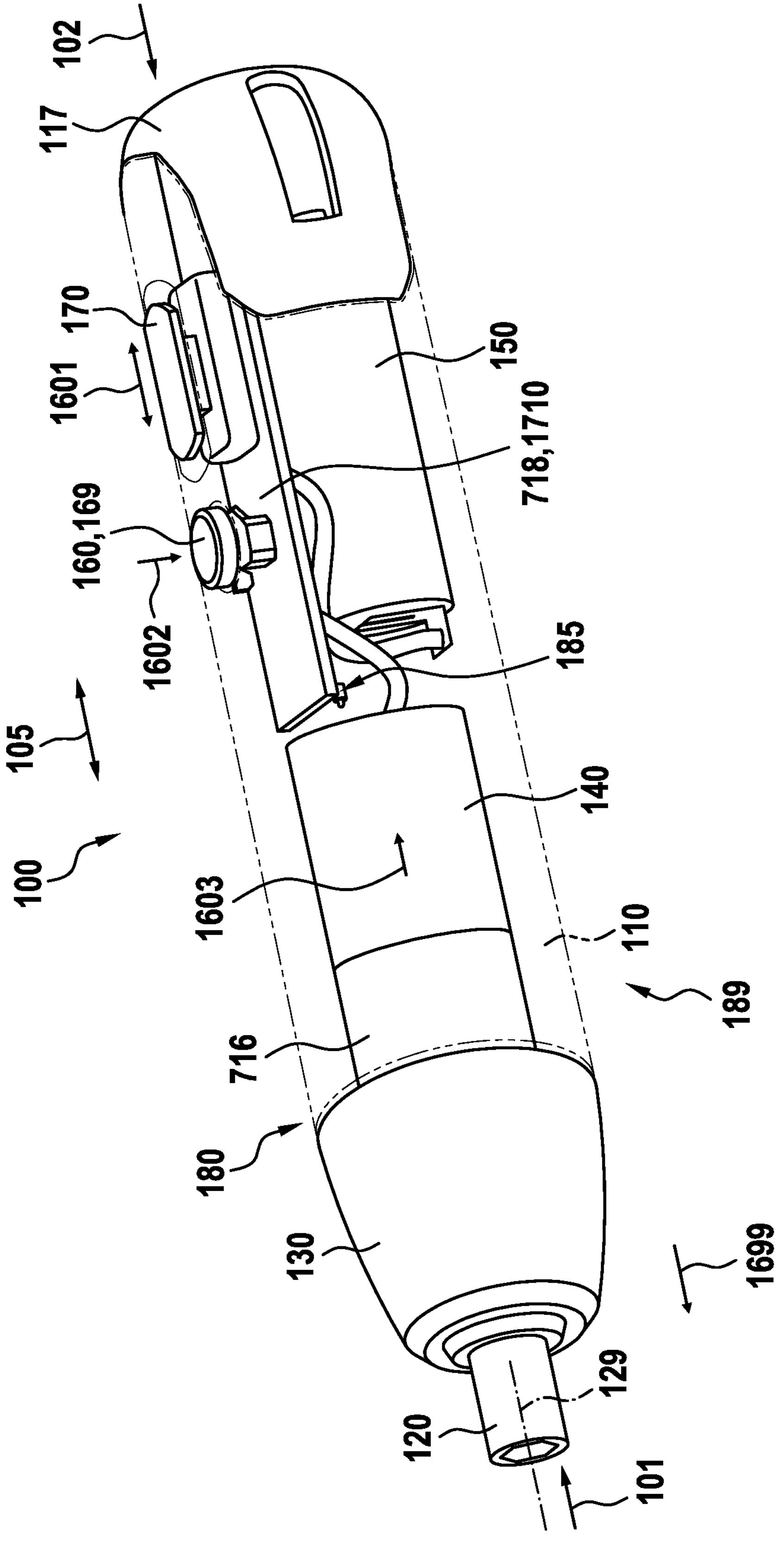
FIG. 18 shows a perspective view of the hand-held power tool from FIGS. 1 to 7 and 14 with a partially transparent housing.

FIG. 18 shows the hand-held power tool 100 from FIGS. 1 to 7 and 14, wherein the housing 110 is illustrated in a transparent state. For the purposes of illustration here, FIG. 18 depicts an actuating direction of the first and of the second activating units 189, 169 and also of the sliding switch 170. For the purposes of illustration here, the sliding switch 170 is actuated along an arrow 1601, preferably in the longitudinal direction 105 of the hand-held power tool 100, and/or in the direction of the first or of the second axial end 101, 102 of the housing 110. It is preferably possible for actuation or displacement of the sliding switch 170 in the direction of the first axial end 101 to set a clockwise rotation of the drive motor 140 and for displacement of the sliding switch 170 in the direction of the second axial end 102 to set an anti-clockwise rotation of the drive motor 140. It is also possible, however, for the clockwise rotation to be achieved by displacement in the direction of the second axial end 102 and for the anti-clockwise rotation to be achieved by displacement in the direction of the first axial end 101.

In addition, an actuating direction of the operating element 160 is formed along an arrow 1602, or in the radial direction of the housing 110, in particular perpendicularly to the motor axis 1119, or perpendicularly to the axis of rotation 129. Furthermore, an actuating direction of the first activating unit 189 is formed in the direction of an arrow 1603, or in the direction of the second axial end 102 of the housing 110.

Figure 20:
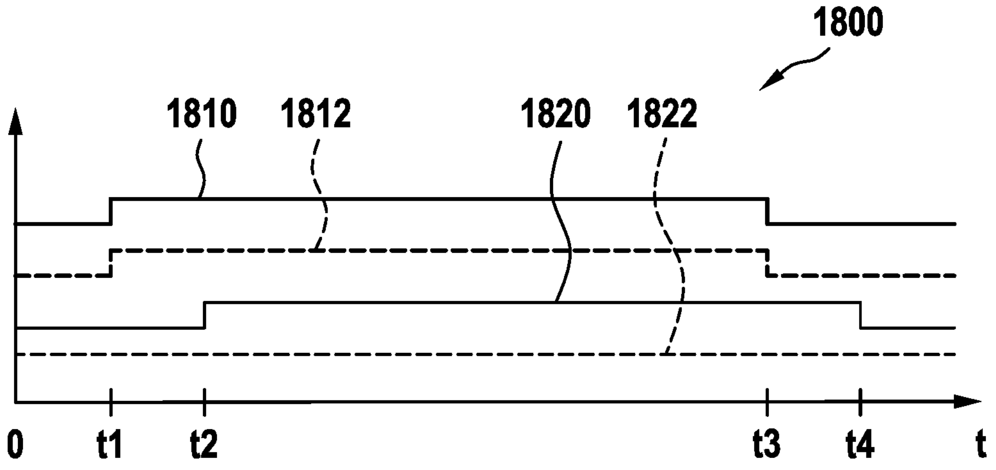
FIG. 20 shows a diagram which is assigned to a selector of an activating unit of the operating elements of the hand-held power tool from FIG. 18.
Figure 21:
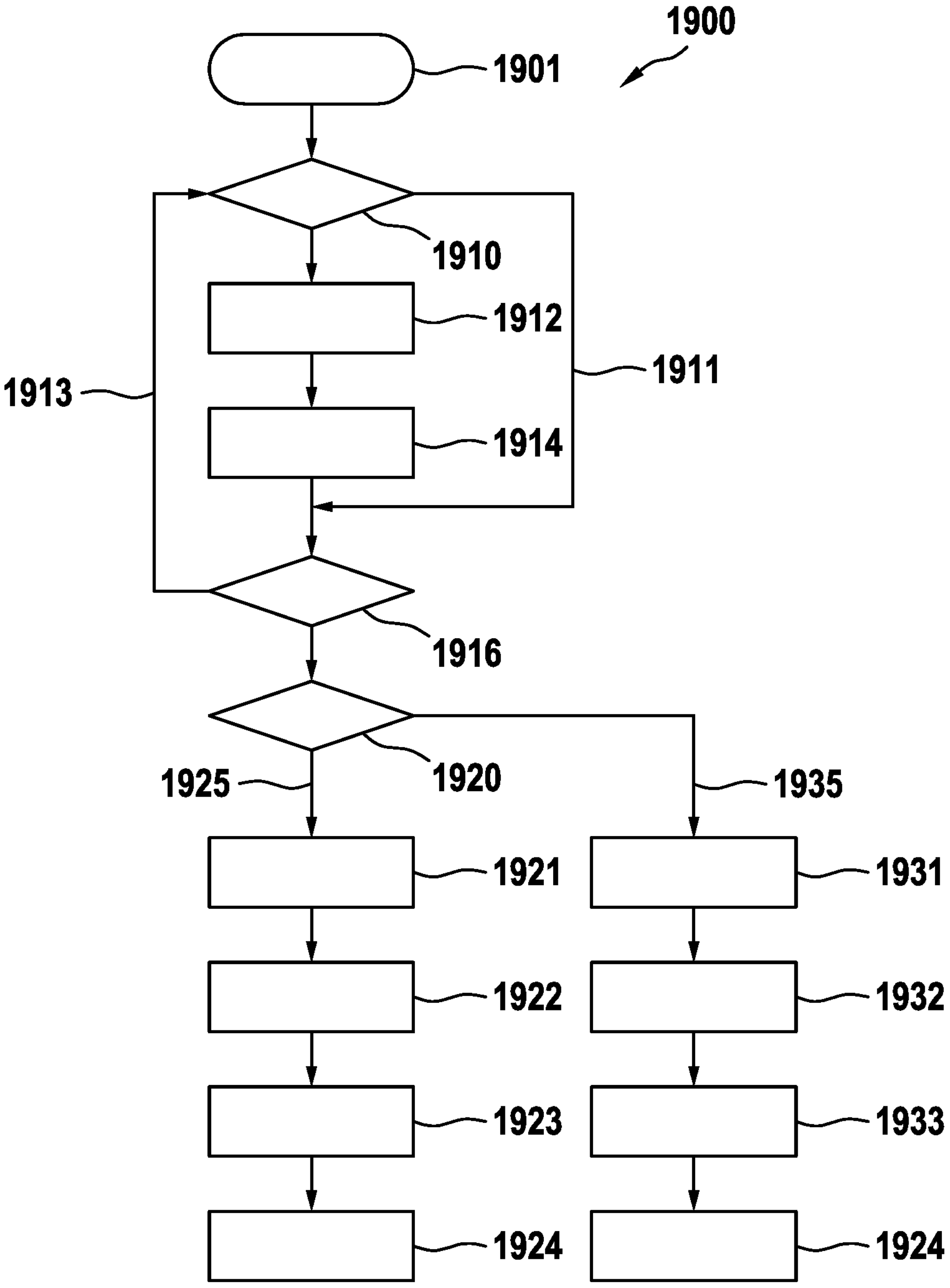
FIG. 21 shows a flow diagram for illustrating operation of an alternative selector of an activating unit of the operating elements of the hand-held power tool from FIG. 18.

According to one embodiment, the hand-held power tool 100 has a selector 1710, which is designed to deactivate the first or the second activating unit 189, 169 and/or to prioritize the first or the second activating unit 189, 169. According to a first embodiment, the selector 1710 is designed to prioritize the first or the second activating unit 189, 169, wherein FIG. 20 illustrates an example of the prioritization in a diagram (1800 in FIG. 20). According to a second embodiment, which is an alternative or option to the first embodiment, the selector 1710 is designed to deactivate the first or the second activating unit 189, 169, wherein FIG. 21 shows a flow diagram (1900 in FIG. 21) for the purpose of depicting an example of the operation of the selector 1710 according to the second embodiment. The selector 1710 is preferably assigned to the drive electronics 718.

Figure 19:
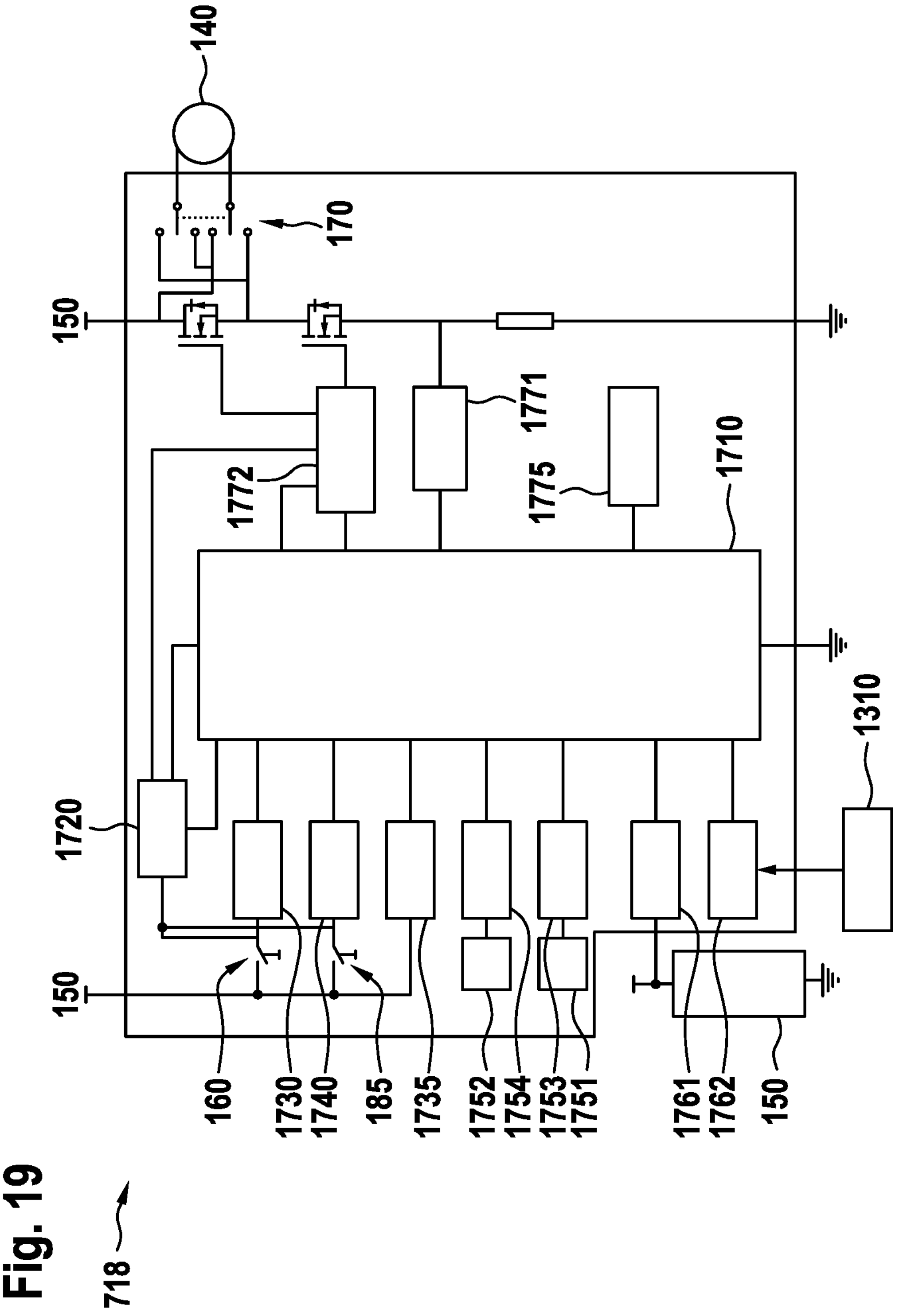
FIG. 19 shows an example of the construction of drive electronics which are assigned to the hand-held power tool from FIG. 18.

FIG. 19 depicts an example of the construction of the drive electronics 718 from FIGS. 7 and 18 of the hand-held power tool 100 from FIGS. 1 to 7. The drive electronics 718 from FIG. 18 are preferably assigned the selector 1710 from FIG. 18, which is designed, by way of example, in the form of a controller. The drive electronics 718 are preferably supplied with current by the power-supply unit 150. The power-supply unit 150 here is connected to the controller 1710 via a charging unit 1761. Furthermore, the charging socket 1310 is connected to the controller 1710 preferably via a charging-detection unit 1762.

The drive electronics 718 are preferably assigned the sliding switch 170 for activating reversing operation of the drive motor 140. The sliding switch 170 is preferably a mechanical switch. The drive motor 140 is preferably assigned a current-detection means 1771, which is connected to the controller 1710. In addition, the drive motor 140 is assigned motor electronics 1772, which are preferably likewise connected to the controller 1710.

According to one embodiment, the operating element 160 of the second activating unit 169 is connected to the controller 1710 via an actuation-detection means 1730. In a manner analogous to this, the pressure switch 185 of the first activating unit 189 is connected to the controller 1710 via an actuation-detection means 1740.

Additionally provided is a power-switching means 1720, which connects together, and/or switches, the first and the second activating units 189, 169 and the controller 1710. Further provided is a voltage-monitoring means 1735, which is designed to monitor a voltage assigned to the power-supply unit 150.

One embodiment provides at least one temperature sensor, preferably two temperature sensors 1751, 1752. A first temperature sensor 1751 is preferably assigned to the drive electronics 718. A second temperature sensor 1752 is preferably assigned to the power-supply unit 150. The first temperature sensor 1751 is preferably assigned a first detection unit 1753. The second temperature sensor 1752 is preferably assigned a second detection unit 1754. The two temperature sensors 1751, 1752 illustrated are preferably connected to the controller 1710 via their associated detection units 1753, 1754.

In addition, the drive electronics 718 are preferably assigned a battery-status indicator 1775. The battery-status indicator 1775 preferably visualizes a state of charge of the power-supply unit 150. It is pointed out that the drive electronics 718 shown are given merely by way of example and should not be considered to be limiting to the present disclosure. It is thus also possible for the drive electronics 718 to be designed, for example, without temperature sensors 1751, 1752.

FIG. 20 shows a diagram 1800, which is assigned to the selector 1710 from FIG. 17 and illustrates an example of the operation of the selector 1710 where the first or the second activating unit 189, 169 from FIGS. 1, 7 and/or 18 is prioritized. Prioritization takes place here preferably in dependence on a first-actuated activating unit 189, 169. In the case of prioritization, a higher priority is assigned to the first-actuated activating unit 169, 189 of the first or of the second activating unit 189, 169. A first-actuated activating unit 169, 189 is understood to mean the activating unit 169, 189 which a user of the hand-held power tool 100 actuates first.

The diagram 1800 represents actuation of the first and of the second activating units 189, 169, wherein a curve 1810 depicts actuation of the operating element 160 and the curve 1820 depicts actuation of the activating unit 189 or of the pressure switch 185. Furthermore, the curves 1812 and 1822 each represent activation signals of the drive motor 140, said signals being assigned to the respective curve 1810, 1820.

The curve 1810 depicts activation of the operating element 160 at the point in time t1 and deactivation of the operating element 160 at the point in time t3. The curve 1820 describes activation of the pressure switch 185 of the first activating unit 189 at the point in time t2 and deactivation of the pressure switch 185 at the point in time t4. Since the activation of the operating element 160 at the point in time t1 precedes the activation of the pressure switch 185 at the point in time t2, the operating element 160 or the second activating unit 169 is given higher priority than the first activating unit 189. This results in activation of the drive motor 140 by the operating element 160 at the point in time t1, which is represented by the curve 1812. The prioritization of the second activating unit 169 means that no consideration is given to actuation of the first activating unit 189. This is depicted by the curve 1822, which, despite actuation of the first activating unit 189 at the point in time t2, remains in an off state and does not supply any transmission signal to the drive motor 140.

The selector 1710 from FIG. 17 is preferably designed here to deactivate the activating unit not given higher priority, in FIG. 20 the first activating unit 189. The deactivation is depicted by the curve 1822, since, despite activation of the first activating unit 189 at the point in time t2, said curve remains unchanged.

However, it is pointed out that the diagram 1800 illustrated is given merely by way of example and should not be considered to be limiting to the present disclosure. It is therefore possible for the first activating unit 189, if activated at an earlier time, e.g. at the point in time t1, likewise to be given higher priority. A user preferably defines the priority by way of actuation.

FIG. 21 shows a flow diagram 1900 for the purpose of depicting an example of the operation of the selector 1710 from FIG. 17 during deactivation of the first or of the second activating unit 189, 169. As an alternative to this, it is also possible for the two activating units 169, 189 to be activated by the selector 1710. In addition, in the case of exclusive, in particular sole, actuation of one of the first and of the second activating units 189, 169 over a comparatively long period of actuation 1912, the respectively other activating unit of the first and of the second activating units 189, 169 can be deactivated by the selector 1710. This means that, in the case of the first activating unit 189 being actuated for a comparatively long period of time, the second activating unit 169 is deactivated, or vice versa. According to one embodiment, the comparatively long period of actuation 1912 is at least 3 seconds.

During operation of the selector 1710 according to the flow diagram 1900, first of all the selector 1710 is started upon activation or switch-on of the hand-held power tool 100 from FIGS. 1 to 7 in step 1901. It is pointed out that it is possible for the hand-held power tool 100 to be activated or switched on, for example, by virtue of the power-supply unit 150 being arranged in the hand-held power tool 100, to be activated by a signal from a movement sensor assigned to the hand-held power tool 100, by an activation switch being on, etc. Then, in step 1910, an enquiry is made as to whether the sliding switch 170 is arranged in a neutral position. The neutral position is preferably a position between the clockwise position and the anti-clockwise position. If the sliding switch 170 is arranged in a neutral position, a step 1912 takes place, or the operating element 160 is actuated over a comparatively long period of actuation. As a result of the operating element 160 being actuated for the predetermined long period of actuation, the pressure switch 185, in step 1914, is deactivated or activated. If the pressure switch 185 has been deactivated prior to actuation of the operating element 160 in step 1914, then it is activated and, if the pressure switch 185 has been activated prior to actuation of the operating element 160 in step 1914, then it is deactivated.

In step 1916, an enquiry is made anew as to the position of the sliding switch 170. If the sliding switch 170 is once again in the neutral position, this gives rise to a return, via the path 1913, to step 1910. In step 1910, then, the direction of rotation of the drive motor 140 can be set via the sliding switch 170. If, then, the sliding switch 170 is no longer located in the neutral position, then a path 1911 leads to an enquiry being made anew as to the position of the sliding switch 170 in step 1916. If the sliding switch 170, then, is arranged in the forward position or the rearward position, or in other words the clockwise/anti-clockwise position, this gives rise to step 1920, in which an enquiry is made as to whether the pressure switch 185 has been deactivated. If the pressure switch 185 has been deactivated, a path 1925 leads to step 1921, in which the operating element 160 is activated. If the operating element 160 is activated, the drive motor 140 is activated in step 1922. If, subsequently, the operating element 160 is deactivated or disengaged in step 1923, this is followed, in step 1924, by the drive motor 140 being stopped.

However, if the pressure switch 185 of the first activating unit 189 has been activated in step 1920, then a path 1935 leads to step 1931, in which the operating element 160 or the pressure switch 185 is activated. The activation causes, in step 1932, the drive motor 140 to be activated. If the operating element 160 is deactivated or disengaged by way of example in step 1933, then the drive motor 140 is stopped in step 1924.

It is pointed out that, in the diagram 1900, the drive motor 140 is deactivated merely as a result of the operating element 160 being deactivated or of the operating element 160 being disengaged, but this should not be considered to be limiting to the present disclosure. For example, it is also possible for the drive motor 140 to be deactivated by the first activating unit 189, or for deactivation to take place by way of the pressure switch 185. In addition, a comparatively long period of actuation of the second activating unit 169 or of the pressure switch 185 can also deactivate the second activating unit 169 or the operating element 160.

The invention claimed is:

1. A hand-held power tool comprising:
   - an elongate housing including a grip region;
   - a drive motor arranged in the elongate housing and configured to drive an insertion tool;
   - a tool holder configured to receive the insertion tool;
   - at least one operating element arranged in the grip region and configured to activate the drive motor;
   - a sliding switch arranged on the housing and configured to activate a reversing operation of the drive motor;
   - a first activating unit configured to activate the drive motor as a result of axial contact of the tool holder against a workpiece which is to be machined;
   - a second activating unit configured to activate the drive motor as a result of activation of the at least one operating element; and
   - a selector configured to prioritize the first or second activating unit in dependence on a first one of the first and second activating units that is actuated first and to assign a higher priority to the first one of the activating units that is actuated first.

2. The hand-held power tool according to claim 1, wherein the selector is configured to deactivate the other one of the first and second activating units that is not assigned the higher priority.

3. The hand-held power tool according to claim 1, wherein the housing is assigned a first possible grip position and a second possible grip position.

4. The hand-held power tool according to claim 1, wherein the at least one operating element and the sliding switch are arranged so as to enable a user to operate both the at least one operating element and the sliding switch using one finger.

5. The hand-held power tool according to claim 1, wherein the at least one operating element and the sliding switch are arranged at an axial end of the elongate housing that is directed away from the tool holder.

6. The hand-held power tool according to claim 1, wherein the first activating unit is configured to activate the drive motor in response to contact of the tool holder measuring at least a predetermined pressure.

7. The hand-held power tool according to claim 1, wherein the hand-held power tool is a screwdriver.

8. The hand-held power tool according to claim 4, wherein the at least one operating element and the sliding switch are arranged so as to enable the user to operate both the at least one operating element and the sliding switch using a thumb.

9. A hand-held power tool comprising:
   - an elongate housing including a grip region;
   - a drive motor arranged in the elongate housing and configured to drive an insertion tool;
   - a tool holder configured to receive the insertion tool;
   - at least one operating element arranged in the grip region and configured to activate the drive motor;
   - a sliding switch arranged on the housing and configured to activate a reversing operation of the drive motor;
   - a first activating unit configured to activate the drive motor as a result of axial contact of the tool holder against a workpiece which is to be machined;
   - a second activating unit configured to activate the drive motor as a result of activation of the at least one operating element; and
   - a selector configured to deactivate the first or second activating unit and/or to prioritize the first or second activating unit, wherein, in at least one operating mode, the selector is configured to enable both the first and second activating units to activate the drive motor.

10. The hand-held power tool according to claim 9, wherein, in response to exclusive activation of one of the first or second activating units for a predetermined time period of actuation, the selector is configured to deactivate the respectively other activating unit of the first or second activating units.

11. The hand-held power tool according to claim 10, wherein the predetermined time period of actuation is at least 3 seconds.

* * * * *